US010486790B2

(12) United States Patent
Steindl et al.

(10) Patent No.: US 10,486,790 B2
(45) Date of Patent: Nov. 26, 2019

(54) MAINTENANCE STEP FOR A HELICOPTER (71) Applicant: AIRBUS HELICOPTERS DEUTSCHLAND GMBH, Donauworth (DE)

(72) Inventors: Christoph Steindl, Neusab (DE); Dominik Strobel, Fuenfstetten (DE)

(73) Assignee: AIRBUS HELICOPTERS DEUTSCHLAND GmbH, Donauworth (DE)

( * ) Notice: Subject to any disclaimer, the term of this patent is extended or adjusted under 35 U.S.C. 154(b) by 389 days.

(21) Appl. No.: 15/335,574

(22) Filed: Oct. 27, 2016

(65) Prior Publication Data
US 2017/0121008 A1    May 4, 2017

(30) Foreign Application Priority Data

Oct. 29, 2015  (EP) .................................... 15400050

(51) Int. Cl.
*B64C 1/24* (2006.01)
*B60R 3/02* (2006.01)

(52) U.S. Cl.
CPC . *B64C 1/24* (2013.01); *B60R 3/02* (2013.01)

(58) Field of Classification Search
CPC ......... B60R 3/02; B60R 3/007; B64C 1/1407; B64C 1/1415; B64C 1/24; B63B 27/146; B63B 2027/141; B63B 27/14; B63B 27/143
See application file for complete search history.

(56) References Cited

U.S. PATENT DOCUMENTS

| 2,196,546 | A | * | 4/1940 | Bowers | ................ | B64C 1/1407 |
| | | | | | | 182/77 |
| 2,446,434 | A | | 8/1948 | Rechain | | |
| 2,558,975 | A | * | 7/1951 | Moreno | ................. | B63B 27/14 |
| | | | | | | 114/65 R |
| 2,568,093 | A | * | 9/1951 | Smid | ........................ | B60R 3/02 |
| | | | | | | 182/88 |
| 3,612,563 | A | | 10/1971 | Kazmark | | |
| 3,892,429 | A | | 7/1975 | Dalmy | | |
| 3,998,476 | A | | 12/1976 | Kazmark, Sr. | | |

(Continued)

FOREIGN PATENT DOCUMENTS

| DE | 7006082 | 6/1970 |
| DE | 2643463 | 4/1977 |

(Continued)

OTHER PUBLICATIONS

Russian Search Report for Russian Application No. RU 2016142367/11, Completed by the Russian Patent Office, dated Nov. 7, 2017, 2 Pages.

(Continued)

*Primary Examiner* — Medhat Badawi
*Assistant Examiner* — Vicente Rodriguez
(74) *Attorney, Agent, or Firm* — Brooks Kushman P.C.

(57) ABSTRACT

A maintenance step for a helicopter, comprising: a casing that is adapted for integration into a lateral shell of a fuselage of a helicopter, and a step member that is pivotally mounted to the casing, wherein a stirrup unit is pivotally mounted to the step member, the stirrup unit comprising at least a first and a second section, the second section being telescopically mounted to the first section.

19 Claims, 4 Drawing Sheets (56) References Cited

U.S. PATENT DOCUMENTS

| | | | |
|---|---|---|---|
| 4,068,770 A * | 1/1978 | Boehringer | B60R 3/02 |
| | | | 14/71.1 |
| 4,079,015 A | 3/1978 | Paucot et al. | |
| D287,714 S * | 1/1987 | Short | D12/345 |
| 5,586,628 A | 12/1996 | Wang | |
| 5,806,627 A * | 9/1998 | Wilson | B64D 9/00 |
| | | | 182/127 |
| 6,189,833 B1 * | 2/2001 | Ambrose | B64C 1/1407 |
| | | | 244/118.3 |
| 7,182,175 B1 * | 2/2007 | Schmitt | B63B 27/143 |
| | | | 114/362 |
| 8,348,015 B2 * | 1/2013 | Parker | E06C 1/125 |
| | | | 182/195 |
| 8,905,354 B2 | 12/2014 | Griffiths et al. | |
| 2003/0038007 A1 | 2/2003 | Han | |
| 2009/0008187 A1 * | 1/2009 | Garelick | B63B 27/146 |
| | | | 182/91 |
| 2010/0219019 A1 * | 9/2010 | Sedlack, II | B63B 27/146 |
| | | | 182/194 |
| 2011/0272524 A1 * | 11/2011 | Gorlich | B64C 1/24 |
| | | | 244/129.6 |

FOREIGN PATENT DOCUMENTS

| | | |
|---|---|---|
| DE | 102012013612 | 1/2014 |
| RU | 106864 U1 | 7/2011 |

OTHER PUBLICATIONS

Extended European Search Report for European Application No. EP 15400050.9, Completed by the European Patent Office, dated May 3, 2016, 5 Pages.

* cited by examiner

MAINTENANCE STEP FOR A HELICOPTER

CROSS REFERENCE TO RELATED APPLICATION

This application claims priority to European patent application No. EP 15400050.9 filed Oct. 29, 2015, the disclosure of which is incorporated in its entirety by reference herein.

BACKGROUND OF THE INVENTION (1) Field of the Invention

The present invention is related to a maintenance step for a helicopter, said maintenance step comprising the features of claim 1. The present invention is further related to a helicopter with such a maintenance step, said helicopter comprising the features of claim 15.

(2) Description of Related Art

Maintenance steps are generally present on all helicopters and can be provided in different numbers on the helicopters dependent e.g. on an underlying helicopter size. For instance, three maintenance steps per side are provided on the H135 and H145 from Airbus Helicopters and more steps can be provided e.g. on the NH90 from Airbus helicopters.

In general, maintenance steps are adapted to allow maintenance crew members to get in a position where they can fulfil required maintenance tasks, especially checks at the helicopter's engines and main gear box. Thus, the maintenance steps must be suitable to provide access to respective upper decks of helicopters so that they are always located outside of a helicopter, namely in a lateral shell of the helicopter's fuselage.

More specifically, maintenance steps are usually part of a fuselage of a helicopter and can be visible to the outside, i.e. distinguishable from the fuselage. However, they are preferably hidden and retracted, i.e. made flush to an outer surface of the fuselage, in flight operation of the helicopter.

An exemplary maintenance step on a fuselage of a helicopter comprises a trap-like single step that is pivotally mounted to a support element and connected to a rotatable stirrup, which is storable on the support element. However, due to the dimensions of the rotatable stirrup, the trap-like single step must be designed relatively large such that the trap-like single step can be stored thereon. This, nevertheless, results in additional weight, costs and integration problems of the maintenance step. Furthermore, this maintenance step cannot be used for an undercut in a lateral shell of a helicopter's fuselage, as the support element cannot be adapted thereto in a suitable manner.

The document US 2011/0272524 A1 describes an integrated maintenance step on a fuselage of a helicopter. This maintenance step comprises a casing that is integrated into a lateral shell of the fuselage for access from outside of the helicopter, and a single step that is pivotally mounted in the casing. In other words, the maintenance step is foldable and flush to an outer surface of the fuselage of the helicopter. The term "flush" means that the outer surface is smooth and the maintenance step is integrated into this outer surface such that it is not distinguishable when observed from a predetermined distance.

The document U.S. Pat. No. 8,905,354 B1 describes a foldable step assembly for a helicopter with a housing and a single support member that is hingedly coupled to the housing by means of a shaft. The support member is configured as a step support and a hand hold device and it is adapted to rotate between a stored position and a deployed position. Furthermore, a first locking feature is associated with the support member and a second locking feature is associated with the housing. Moreover, a spring is operably associated with the support member and the housing such that the spring biases the first locking feature towards the second locking feature.

However, the above described maintenance steps and step assemblies only comprise foldable single steps that are folded, i.e. turned around a single axis, in order to provide a step for getting access to an upper deck of a helicopter. This kind of single step is, nevertheless, only usable in a straight, middle area of a lateral shell of a helicopter's fuselage. In case of an undercut in the lateral shell, e.g. close to a bottom shell of the helicopter's fuselage, it is not possible to use such a single step without major impact on style, loft and integration in the helicopter. In particular, in case of such an undercut in the lateral shell a single step that is arranged close to a bottom shell of the helicopter's fuselage can simply be unusable or at least not safely or ergonomically usable.

If, however, no other technical solution exists to integrate a maintenance step on a lowest position in an undercut area, i.e. close to a bottom shell of the helicopter's fuselage, so that only a maintenance step in a higher position can be provided, an extra device such as e.g. a small ladder that is placed in front of the helicopter would be necessary to grant access to the maintenance step in the higher position. This is, however, not acceptable if quick access to an upper deck of the helicopter without additional devices should be enabled.

BRIEF SUMMARY OF THE INVENTION

It is, therefore, an object of the present invention to provide a new maintenance step for a helicopter that is at least usable without major restrictions on a lateral shell of a fuselage of a helicopter. This object is solved by a maintenance step for a helicopter having the features of claim 1.

More specifically, according to the present invention a maintenance step for a helicopter comprises a casing that is adapted for integration into a lateral shell of a fuselage of a helicopter, and a step member that is pivotally mounted to the casing. A stirrup unit is pivotally mounted to the step member. The stirrup unit comprises at least a first and a second section, the second section being telescopically mounted to the first section.

Preferably, such a maintenance step is installed on an outer surface, i.e. an outer skin, of a helicopter's fuselage. A corresponding installation location can preferentially be selected arbitrarily and, thus, be along the whole fuselage. In current configurations, this maintenance step is preferentially installed in front and/or rear sections of a helicopter. Thereby, the maintenance step can either be installed from an inside or an outside of the helicopter.

According to one aspect of the present invention, the inventive maintenance step can be installed as an integrated footstep for undercut areas of a helicopter's fuselage. It has a very low negative impact or no impact at all on fuel capacity, only a very low impact on installation volume requirement and no impact at all on a required crash behavior of a helicopter's bottom shell. Furthermore, it represents a light and cheap method for access to a helicopter's upper deck that advantageously does not require additional ground support equipment, such as a small ladder. Finally, the inventive maintenance step is also useable with cold weather gloves, e.g. thick winter gloves.

Advantageously, the inventive maintenance step combines two separate step members that are even useable for undercut areas. This means that there is no need for space allocation of an additional lower maintenance step, such as e.g. a maintenance step on a lowest position in an undercut area close to a bottom shell of a helicopter's fuselage, as the stirrup unit would replace such an additional lower maintenance step.

Consequently, a key benefit of the inventive maintenance step is to enable space savings for integration of other equipment (e.g. fuel) and to allow provision of a maintenance step in an area of a helicopter's fuselage, where normally no integrated maintenance step can be installed. Furthermore, the inventive maintenance step is easy to use for operation and safe locking during flight operation of a helicopter. It has a flat design for reduced space requirement inside the helicopter and it provides modularity at minimum installation space for maximal use.

A further advantage of the inventive maintenance step is to get more space available. Moreover, the costs for the inventive maintenance step are decreased by approximately 50% and its weight by approximately 9%, compared to a conventional maintenance step. Finally, the inventive maintenance step can be provided with a plastic locking device with very little weight and which is not harming the lateral shell of the fuselage of the helicopter.

According to one aspect of the present invention, the maintenance step has a geometrically equivalent interface to a lateral shell of a fuselage of a corresponding helicopter for allowing modular use for subsequent installation at a plurality of different existing helicopters. Preferably, the casing of the inventive maintenance step is integrated into a lateral shell of a fuselage of a helicopter for access from outside.

A first step, which is preferably implemented as the step member with a stepping plate and a covering plate, is preferentially pivotally mounted in the casing, e.g. around a first axis. Preferably, the stepping plate is implemented as a full flat stepping surface with anti-skid painting provided thereon for improved safety during maintenance. The covering plate is preferentially mounted to the stepping plate by at least one safety screw to provide for the step member in its closed position a smooth surface in alignment with the lateral shell of the fuselage of the helicopter. Furthermore, the covering plate can be provided with an opening for a locking device in order to allow for easily fixing the step member in its closed position inside the fuselage.

A second step, which is preferably implemented as the stirrup unit, is preferentially pivotally mounted on the first step, e.g. around a second axis, which can be perpendicular, parallel or otherwise oriented with respect to the first axis. The second step can preferentially be pivoted up to contact with the first step.

Preferably, the stirrup unit is telescopic and can be extended to its full length by at least two and, preferentially, three telescopic elements. In other words, the stirrup unit preferably consists of several telescopic elements, the material, number and lengths of which can be adapted according to application-specific needs. However, the lowest telescopic element in the stirrup unit is preferentially formed in a U-shape for defining a lowest stepping area of the stirrup unit. This lowest stepping area is preferably equipped with anti-slip treatment for safe operation even in adverse condition. Furthermore, securing pins in the telescopic elements are provided according to one aspect of the present invention for securing the length of the stirrup unit in extended form and for providing sufficient strength during use. In addition, if necessary, a rope or rod, which is preferably installed on the stirrup unit, can be provided for connection to an attachment point provided on the fuselage of the helicopter in order to provide additional stiffness.

According to one aspect of the present invention, the maintenance step can be installed in different planes, i.e. at different locations of a helicopter and, therefore, be pivoted around different axes as well. Therefore, the casing is provided with a frame-like support structure, i.e. a frame, and a rearward extension with lateral sides, wherein the rearward extension with the lateral sides is integrated into a lateral shell of the fuselage of the helicopter. Preferably, a backside of the rearward extension is formed with at least one overhang as a cost efficient support for the first step.

Furthermore, the lateral sides preferably comprise coaxial borings, preferentially for bearings, and the first step is provided with corresponding coaxial borings in lateral flanges. Pins, and more specifically pivot pins, are preferably provided for insertion through corresponding coaxial borings into the coaxial borings in the lateral sides of the rearward extension for pivotal mounting of the first step, i.e. its stepping plate, in the casing, and a retaining profile is provided for securing the inserted pivot pins in their respective positions. Preferably, wear resistant bearings are provided for insertion into the corresponding coaxial borings of the lateral sides of the rearward extension of the casing.

The wear resistant bearings are adapted for holding the pivot pins of the first step and, preferentially together with washers at the inside of the lateral sides and coaxially with the bearings, need no replacement during common life cycles of a helicopter. Advantageously, no more than a single boring is provided in the first step as the retaining profile prevents the pivot pins from rotating relative to the lateral sides of the first step.

Preferably, the first step has a hinge mechanism with hinges and hinge pins and the second step is provided with corresponding counter parts of the hinge mechanism. Hinge pins or bolts are preferentially provided for insertion through corresponding coaxial borings provided in the hinges and the first and second steps. These coaxial borings can be equipped with associated bearing elements for pivotal mounting. Finally, in order to enable use of the inventive maintenance step on different curvatures on the lateral shell of the fuselage of the helicopter while still providing a stepping surface that is oriented in parallel to the ground, shim plates can be installed to the casing of the maintenance step.

According to a preferred embodiment of the invention, the second section of the stirrup unit is at least approximately U-shaped and provides an ascendable stepping area.

According to a further preferred embodiment of the invention, the stepping area is provided with anti-slip means.

According to a further preferred embodiment of the invention, the stirrup unit comprises at least one third section that connects the first section to the second section. The at least one third section is telescopically mounted to the first section and is further telescopically mounted to the second section.

According to a further preferred embodiment of the invention, the stirrup unit is provided with securing pins that are adapted for restricting telescopic movement of the first, second and third sections relative to each other.

According to a further preferred embodiment of the invention, the step member is provided with anti-slip means.

According to a further preferred embodiment of the invention, a locking device is provided for locking the step member in the casing in a closed state of the maintenance step.

According to a further preferred embodiment of the invention, the casing is provided with an overhang that is adapted for blocking the step member in an opened state of the maintenance step.

According to a further preferred embodiment of the invention, the step member comprises a stepping plate that is provided with a covering plate. The covering plate is implemented as a filling part that is adapted for creating at least approximately a continuous surface with a lateral shell of a fuselage of a helicopter to which the maintenance step is mountable.

According to a further preferred embodiment of the invention, the covering plate is attached to the stepping plate by means of associated fixing elements.

According to a further preferred embodiment of the invention, an attachment rope or rod is provided. The attachment rope or rod is adapted for securing the step member in an opened state of the maintenance step to a lateral shell of a fuselage of a helicopter to which the maintenance step is mountable.

According to a further preferred embodiment of the invention, a retaining element is provided. The retaining element is adapted for releasably retaining the stirrup unit at the step member in a retracted state of the stirrup unit.

According to a further preferred embodiment of the invention, shim plates are associated with the step member. The shim plates are adapted for enabling a horizontal alignment of the step member independent of a respective inclination angle of the casing.

According to a further preferred embodiment of the invention, the casing is provided with at least one slope that is adapted for preventing water accumulation in the casing.

The present invention further provides a helicopter with a fuselage that comprises a lateral shell to which a maintenance step as described above is mounted.

By way of example, a method of mounting an inventive maintenance step to a lateral shell of a fuselage of a helicopter according to the present invention is described hereinafter. Furthermore, a method of dismounting such an inventive maintenance step from a lateral shell of a fuselage of a helicopter according to the present invention is described hereinafter.

Preferably, a method for mounting an inventive maintenance step to a lateral shell of a fuselage of a helicopter comprises:
  inserting a rearward extension of an essentially rectangular casing of the maintenance step into the prepared fuselage of the helicopter,
  riveting an essentially rectangular frame of the essentially rectangular casing flat against the lateral shell of the prepared fuselage of the helicopter,
  mounting bearings into coaxial borings in lateral sides of the rearward extension of the essentially rectangular casing, and
  inserting pins from within a mid-box through corresponding coaxial borings into the coaxial borings in the lateral sides of the rearward extension and clipping a retaining profile into grooves at inwardly pointing ends of the inserted pins to fix the inserted pins in their position.

Preferably, the retaining profile is held in its clipped position by the covering plate of the maintenance step, which is biased against the retaining profile after screwing by use of screws of the covering plate to the step member of the maintenance step. Suitable telescopic elements are preferentially slid into each other and securing pins are fixed. Furthermore, hinges are attached to the telescopic elements and a step member of the maintenance step.

Advantageously, this method of mounting the inventive maintenance step to a lateral shell of a fuselage of a helicopter is particularly simple, fast and leads to provision of a highly reliable maintenance step.

In addition, washers, preferably distance washers, can be arranged inside the lateral sides and coaxially with the bearings before insertion of pivot pins for low friction. Furthermore, a surface opposite to a stepping area of a stepping plate of the step member can be provided with a covering plate screwed with safety screws for a smooth surface in alignment with the lateral shell of the fuselage of the helicopter.

Preferably, a method for dismounting an inventive maintenance step to a lateral shell of a fuselage of a helicopter comprises:
  unscrewing and removing the covering plate from the step member, if applicable,
  withdrawing the retaining profile from its clipped position,
  taking the retaining profile out of the grooves at the inwardly pointing ends of the inserted pivot pins,
  removing the pivot pins from their positions in the coaxial borings, and taking the step member out of the prepared fuselage of the helicopter.

Thus, the complete maintenance step can advantageously be dismounted after removal of the retaining clips and displacement of both pivot pins in the middle position.

BRIEF DESCRIPTION OF THE SEVERAL VIEWS OF THE DRAWINGS

Preferred embodiments of the invention are outlined by way of example in the following description with reference to the attached drawings. In these attached drawings, identical or identically functioning components and elements are labeled with identical reference numbers and characters and are, consequently, only described once in the following description.

DETAILED DESCRIPTION OF THE INVENTION

Figure 1:
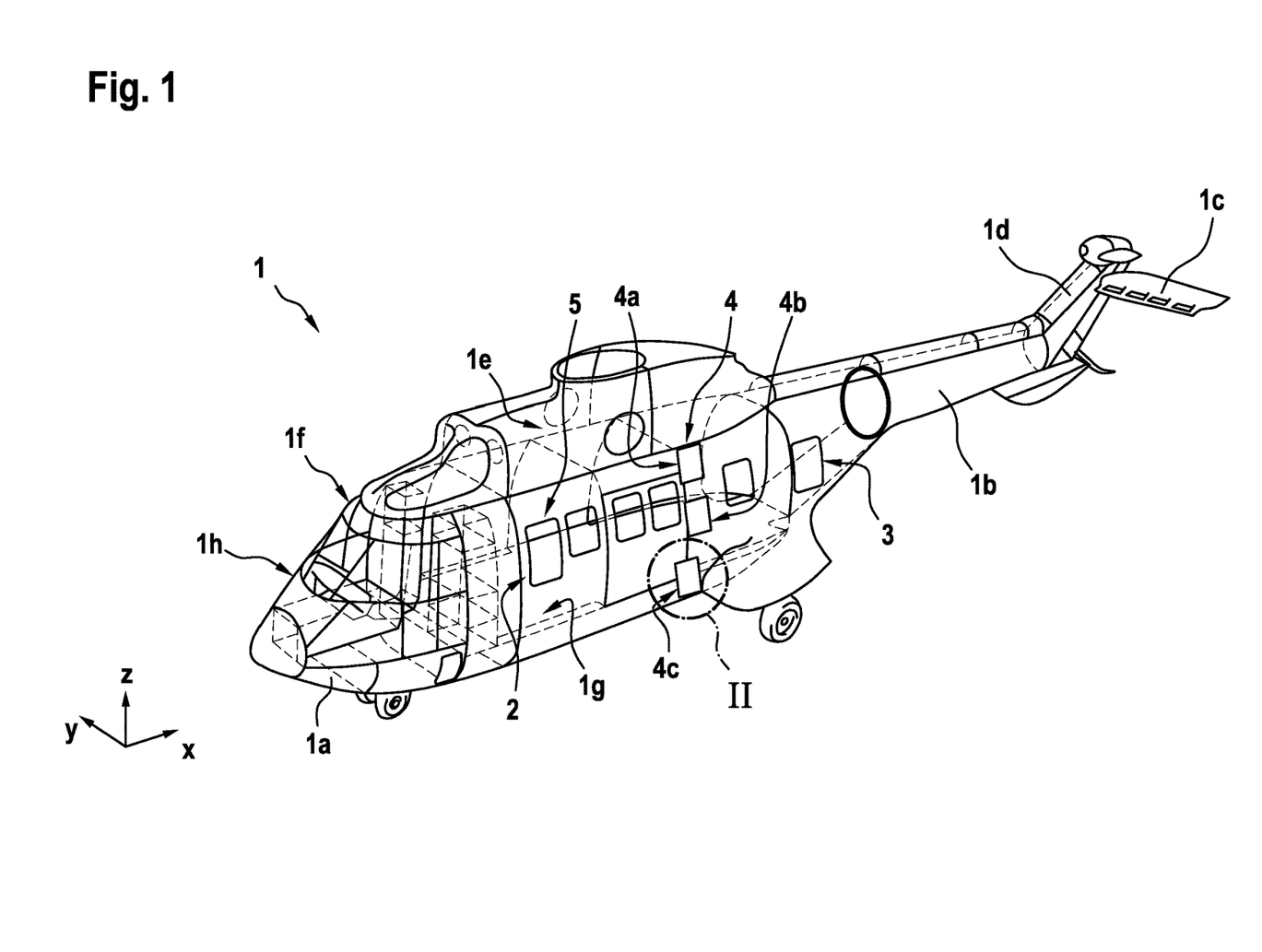
FIG. 1 shows a simplified perspective view of a helicopter with a maintenance step according to the present invention.

FIG. 1 shows a rotary wing aircraft 1 with a plurality of maintenance steps 4 that is exemplarily illustrated as a helicopter. Thus, for purposes of simplicity and clarity, the rotary wing aircraft 1 is hereinafter referred to as the "helicopter" 1. The present invention is, however, not limited to helicopters and can likewise be applied to any other vehicle, in particular to a vehicle that requires one or more maintenance steps, independent of a particular configuration thereof.

Illustratively, the helicopter 1 comprises a fuselage 1a that defines a tail boom 1b, which exemplarily comprises a tail wing 1c and a fin 1d. The tail boom 1b may further be provided e.g. with a horizontal stabilizer, a bumper and so on.

It should be noted that only the fuselage 1a with the tail boom 1b are shown in FIG. 1 for purposes of simplicity and clarity of the drawings. However, other conventional components, such as e.g. a rotor of the helicopter 1, are not shown, as they are well-known to the person skilled in the art and not part of the present invention and would, thus, only unnecessarily encumber and complicate the representation.

Illustratively, the fuselage 1a comprises at least two longitudinal side walls, a board side wall respectively lateral shell 1g, which is also referred to hereinafter as the "board side lateral shell 1g", and a starboard side wall respectively lateral shell 1h, which is also referred to hereinafter as the "starboard side lateral shell 1h", both of which are preferably connected to the tail boom 1b. The board side lateral shell 1g and the starboard side lateral shell 1h exemplarily comprise a plurality of doors and/or windows 2, a plurality of maintenance traps 3 and a plurality of emergency exits 5, which are e.g. at least partly defined by the plurality of doors and/or windows 2.

The fuselage 1a illustratively further comprises an outer surface if and preferably defines at least a drive system accommodating region 1e and a cockpit, and may further define a passenger cabin and/or a cargo compartment. However, for simplicity and clarity of the description, such a cockpit, passenger cabin and cargo compartment are not explained in greater detail.

The drive system accommodating region 1e preferably accommodates one or more engines that are adapted for driving the helicopter 1, e.g. by providing power to an associated power distribution unit, such as a gearbox, which then provides this power to a suitable propelling unit, such as e.g. a propeller, rotor or other. Preferably, the one or more engines are embodied as air breathing propulsion engines, such as diesel engines, gas engines, gas turbines and so on, which combust a fuel/air mix for power generation. However, as the air breathing propulsion engines as such are not part of the present invention, they are not explained in greater detail for brevity and conciseness.

According to one aspect of the present invention, the fuselage 1a and, more generally the helicopter 1, is further provided with the plurality of maintenance steps 4. Illustratively, the plurality of maintenance steps 4 are shown on the board side lateral shell 1g and comprise, by way of example, an upper step 4a, a middle step 4b and a lower step 4c.

It should be noted that, by way of example, only the lower step 4c is embodied according to the present invention and described in greater detail hereinafter, while the upper and middle steps 4a, 4b can be implemented as conventional maintenance steps. However, the upper and/or middle steps 4a, 4b may alternatively also be embodied according to the present invention, i.e. have a configuration that is at least similar to the configuration of the lower step 4c as described below.

It should further be noted that the lower step 4c as described hereinafter can also be integrated in other areas of the helicopter 1 where a direct integration of a step is not possible, e.g. in cowlings, fairings, doors and/or ramps. It can further be used as a boarding step, e.g. for pilot/co-pilot, and so on.

Figure 2:
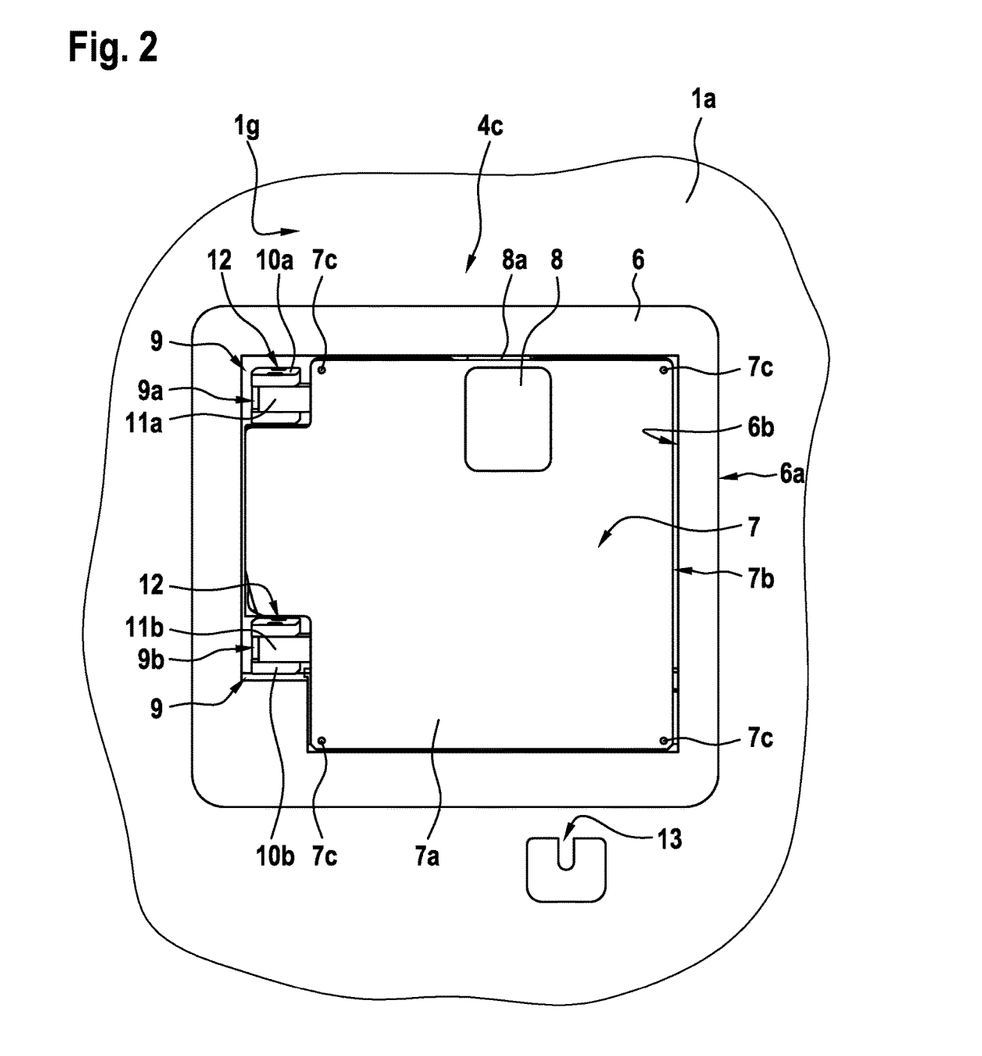
FIG. 2 shows an enlarged detail of the helicopter of FIG. 1 with the maintenance step in stored state.

FIG. 2 shows the maintenance step 4c of FIG. 1, which is mounted to the board side lateral shell 1g of the fuselage 1a of the helicopter 1 of FIG. 1. According to one aspect of the present invention, the board side lateral shell 1g is provided with an attachment point 13. The latter can e.g. be adapted for attachment of an attachment rope or rod (17 in FIG. 3) of the maintenance step 4c for providing additional stiffness in operation. Therefore, the attachment point 13 can be positioned in front, rear or below the maintenance step 4c.

More specifically, the maintenance step 4c preferably comprises a casing 6 that is adapted for integration into the board side lateral shell 1g and a step member 7 that is pivotally mounted to the casing 6. The casing 6 exemplarily comprises a frame-like support structure 6a, which is also referred to hereinafter as the "frame 6a". The latter illustratively defines an inner opening 6b and is preferably closed by a rear wall RW that closes up the board side lateral shell 1g. Thus, the casing 6 defines a tray or bowl-like structure.

By way of example, the casing 6 is integrated into the board side lateral shell 1g such that the maintenance step 4c is mounted to the board side lateral shell 1g. Illustratively, the maintenance step 4c is shown in a closed state, wherein the step member 7 is arranged inside the inner opening 6b of the frame 6a, and preferentially completely accommodated therein. In this closed state, the step member 7 is preferably locked in the casing 6 by means of a locking device 8. The latter is preferentially mounted to the step member 7 and locked in the closed state as illustrated to a lock bar 8a that is provided at the casing 6.

According to one aspect of the present invention, the step member 7 comprises a stepping plate 7b that is provided with a covering plate 7a. The covering plate 7a is preferably implemented as a filling part that is adapted for creating at least approximately a continuous surface with the board side lateral shell 1g. The covering plate 7a is preferentially attached to the stepping plate 7b by means of associated fixing elements 7c, such as e.g. screws, bolts or rivets. Alternatively, the covering plate 7a and the stepping plate 7b can be combined and/or integrated into a single component.

Preferably, the step member 7, and exemplarily the stepping plate 7b, is pivotally mounted to the casing 6, as described below with reference to FIG. 4. For structurally supporting the step member 7, it can be attached to the casing 6, e.g. by means of a rope that interconnects the stepping plate 7b and the frame 6a of the casing 6.

The step member 7, and exemplarily the stepping plate 7b, is preferably connected to hinges 9. By way of example, the hinges 9 comprise a first hinge 9a and a second hinge 9b. In the illustrated closed state of the maintenance step 4c, the first hinge 9a defines an upper hinge and the second hinge 9b defines a lower hinge.

According to one aspect of the present invention, the hinges 9a, 9b comprise associated devises 10a, 10b, which are illustratively pivotally mounted to corresponding hinge arms 11a, 11b by means of hinge pins 12. The hinge arms 11a, 11b are preferably mounted to the step member 7, and exemplarily to the stepping plate 7b, and preferentially form an integral part thereof. In other words, the stepping plate 7b and the hinge arms 11a, 11b are preferably implemented as a single one-piece component.

However, it should be noted that the hinges 9a, 9b are merely illustrated by way of example and not for limiting the invention accordingly. Instead, different kinds of hinge mechanisms can be used, such as e.g. piano hinges, hinge lines and/or other hinge elements.

Figure 3:
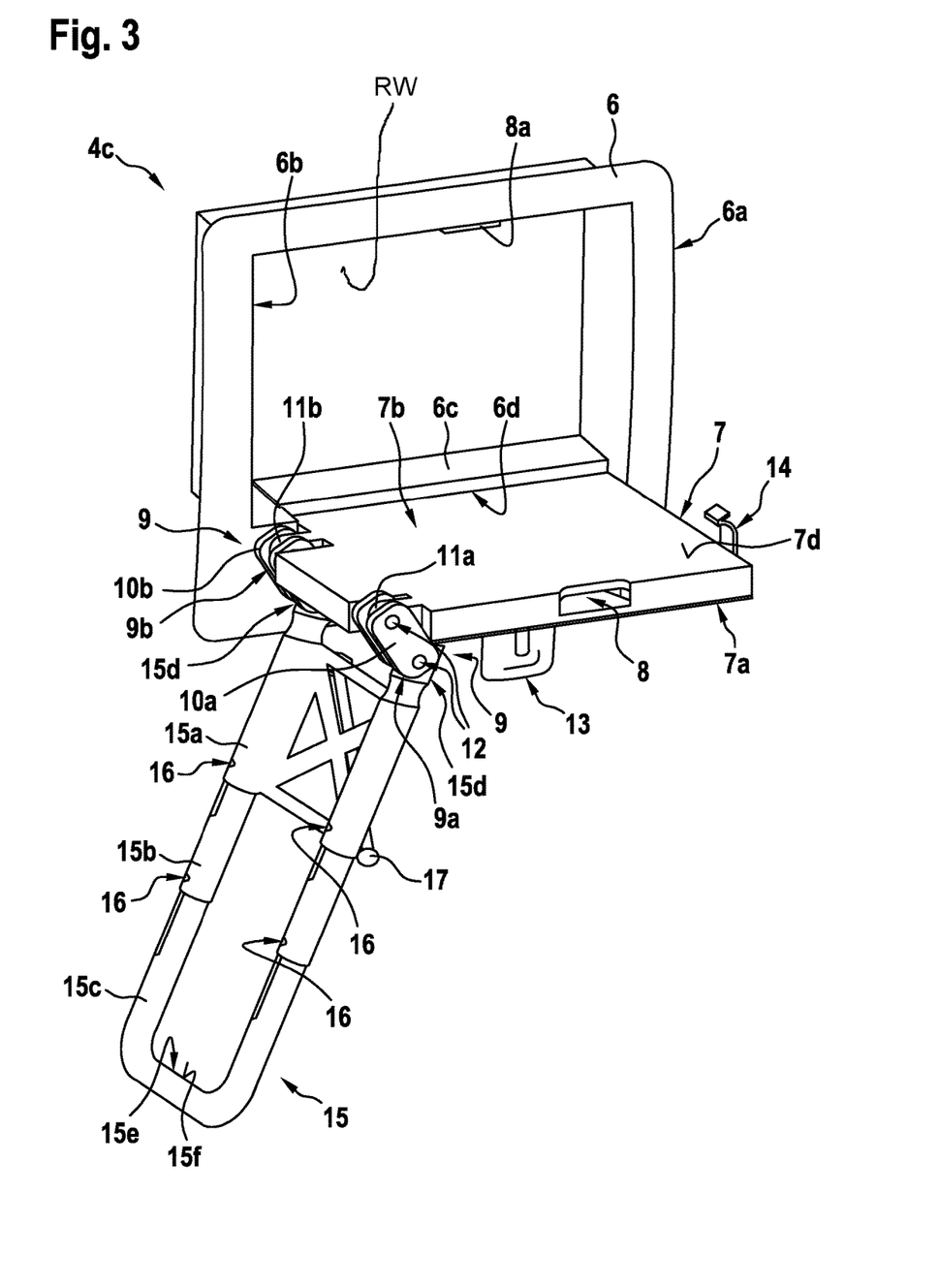
FIG. 3 shows a perspective view of the maintenance step of FIG. 2 in deployed state.

FIG. 3 shows the maintenance step 4c with the casing 6 and the step member 7 of FIG. 2 in an opened state. However, for simplicity and clarity of the drawings, the maintenance step 4c is shown without the board side lateral shell 1g of the fuselage 1a of the helicopter 1 of FIG. 1.

In the opened state of the maintenance step 4c, the step member 7 is pivoted relative to the frame 6a of the casing 6 such that a plane defined by the stepping plate 7b of the step member 7 is now illustratively at least approximately perpendicular to a plane defined by the frame 6a. However, other angles between these planes can likewise be realized, as described below with reference to FIG. 4.

Preferably, the step member 7 is blocked in its illustrated position by means of an overhang 6c of the casing 6. More specifically, this overhang 6c is adapted for blocking the step member 7 in the opened state of the maintenance step 4c and defines together with the frame 6a a receiving opening 6d, wherein a portion of the step member 7 is illustratively received and blocked.

As described above with reference to FIG. 2, the step member 7 and, exemplarily, the stepping plate 7b is connected via the corresponding hinge arms 11a, 11b to the devises 10a, 10b by means of the hinge pins 12 such that the devises 10a, 10b can be pivoted relative to the corresponding hinge arms 11a, 11b. The devises 10a, 10b are preferably further connected by means of additional hinge pins 12 to a stirrup unit 15, which is, thus, pivotally mounted to the step member 7.

The step member 7 thus defines a structural support for the stirrup unit 15. However, other means of structural support of the stirrup unit 15 instead of the step member 7 can likewise be provided, such as a rope or rod.

It should be noted that, by way of example and not for limiting the present invention accordingly, the stirrup unit 15 can be pivoted relative to the step member 7 around an axis, which is exemplarily perpendicular to an axis around which the step member 7 can be pivoted relative to the casing 6. Alternatively, both axes are not perpendicular and other angles, e.g. in a range between 30° and 60°, can likewise be implemented. Still alternatively, both axes can be arranged in parallel and so on.

It should further be noted that the connection between the step member 7 and the stirrup unit 15 is exemplarily embodied by means of two times two hinges. However, the number of hinges can be modified. For instance, instead of using two times two hinges, only a total of two hinges can be used by modifying the step member 7 or the stirrup unit 15. Such a modification is, nevertheless, readily available to the person skilled in the art and, therefore, not further described for brevity and conciseness.

According to one aspect of the present invention, the stirrup unit 15 comprises at least a first and a second section 15a, 15c. The first section 15a is exemplarily pivotally mounted to the devises 10a, 10b by means of the hinge pins 12 at associated hinge connecting portions 15d. The second section 15c is preferably telescopically mounted to the first section 15a. Furthermore, the second section 15c is preferentially at least approximately U-shaped and provides an ascendable stepping area 15e, which is preferably provided with anti-slip means 15f.

It should be noted that the step member 7, and preferentially the stepping plate 7b, is preferably also provided with anti-slip means 7d. These anti-slip means 7d as well as the anti-slip means 15f can be implemented using any suitable anti-slip covering, coating or treatment.

According to one aspect of the present invention, the stirrup unit 15 comprises at least one third section 15b that connects the first section 15a to the second section 15c. The at least one third section 15b is preferably telescopically mounted to the first section 15a and is further telescopically mounted to the second section 15c.

In FIG. 3, the first section 15a exemplarily represents a connection section that is connected to the step member 7 as described above and that illustratively defines an upper section of the stirrup unit 15. The third section 15b exemplarily represents an optional extension section, which can also be omitted if a shorter stirrup unit is required, and which illustratively defines a middle section of the stirrup unit 15. The second section 15c exemplarily represents an ascendable section that is e.g. ascendable by a maintenance crew member and that illustratively defines a lower section of the stirrup unit 15.

However, it should be noted that the stirrup unit 15 is only shown by way of example with the three sections 15a, 15b, 15c, and not for limiting the present invention accordingly. Instead, e.g. additional extension sections and/or ascendable sections can be provided to lengthen the stirrup unit 15 as required, up to forming a ladder. Likewise, as mentioned above, the optional extension section can be omitted. Similarly, the applied sections can be implemented with different materials dependent, e.g., on an intended use. Furthermore, more than one stirrup unit 15 can be integrated into the maintenance step 4c.

It should further be noted, that instead of the described modifications to the stirrup unit 15 alternatively the step member 7 can be modified. For instance, the step member 7 can be completely omitted such that the stirrup unit 15 is directly integrated into the board side lateral shell 1g of FIG. 2, i.e. the casing 6. In this case, the stirrup unit 15 may not be totally smooth/not visible from the outside and not covered with an aerodynamic covering, such as the covering plate 7a. Alternatively, the stirrup unit 15 can be covered by such an aerodynamic cover for enabling a smooth outer skin of the board side lateral shell 1g of FIG. 2. In this case, the aerodynamic cover could be double-used as stepping surface as well.

According to one aspect of the present invention, securing pins 16 are provided that are adapted for restricting telescopic movement of the first, second and third sections 15a, 15b, 15c relative to each other. More specifically, the securing pins 16 are preferably adapted to block the stirrup unit 15 at least in an associated deployed state as shown in FIG. 3 and/or an associated retracted state. In the latter, the securing pins 16 can be adapted for fixing the stirrup unit 15 in its retracted state and for preventing an undesired deployment.

For deploying the stirrup unit 15, the second section 15c can be gripped, e.g. at the stepping area 15e, and pulled away from the first section 15a. For retracting the stirrup unit 15, the second section 15c can be gripped, e.g. at the stepping area 15e, and pushed towards the first section 15a.

In its retracted state, the stirrup unit 15 can be stored on the step member 7 and, more specifically, on the stepping plate 7b after having been rotated towards the latter. Preferably, a retaining element 14 is provided and illustratively rigidly attached to the stepping plate 7b. The retaining element 14 is preferably adapted for releasably retaining the stirrup unit 15 at the step member 7 in the retracted state of the stirrup unit 15.

According to one aspect of the present invention, the stirrup unit 15 is provided with an attachment rope or rod 17. This attachment rope or rod 17 is preferably adapted to support stepping loads and for securing the step member 7 in the opened state of the maintenance step 4c to the attachment point 13 of FIG. 2 and, thus, to the board side lateral shell 1g of the fuselage 1a of the helicopter 1 of FIG. 1. By way of example, the attachment rope or rod 17 is mounted to the first section 15a of the stirrup unit 15 at an associated fixation element (17a in FIG. 4). Alternatively, an end stop can be implemented into the step member 7 with a suitable locking device, such that the attachment rope or rod 17 can be omitted.

Figure 4:
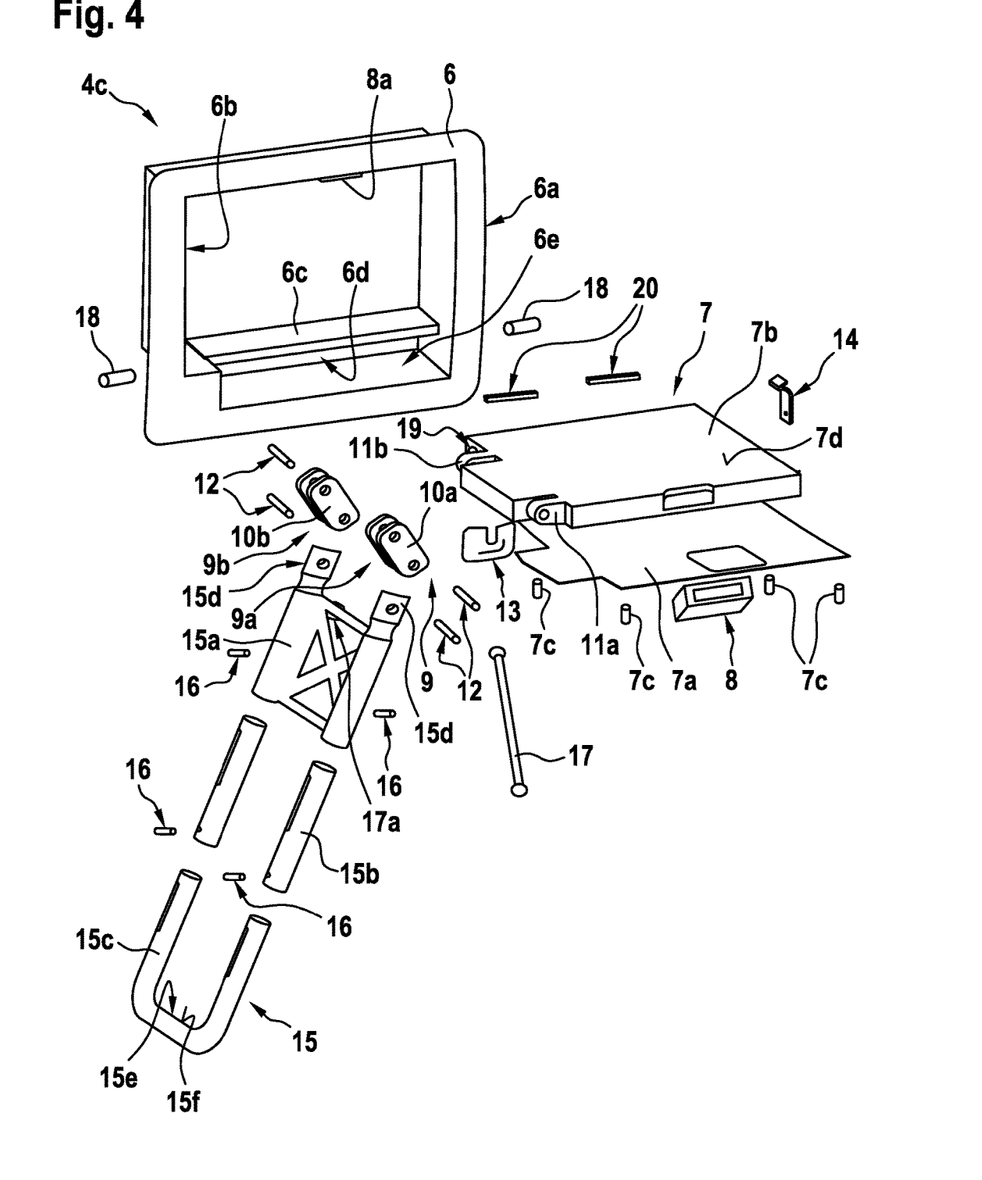
FIG. 4 shows an exploded view of the maintenance step of FIG. 3.

FIG. 4 shows the maintenance step 4c of FIG. 3 for further illustrating the covering plate 7a, the stepping plate 7b with the integral hinge arms 11a, 11b, the fixing elements 7c, the locking device 8, the devises 10a, 10b, the hinge pins 12, the retaining element 14, the three sections 15a, 15b, 15c of the stirrup unit 15, the securing pins 16, the attachment rope or rod 17 and the fixation element 17a. Moreover, the casing 6 with the overhang 6c and the receiving opening 6d of the maintenance step 4c is also further illustrated.

According to one aspect of the present invention, the casing 6 is provided with at least one slope 6e that is adapted for preventing water accumulation in the casing 6. The at least one slope 6e is preferably implemented such that water entering into the casing 6 is forced to exit the casing 6 by means of gravity.

The casing 6 preferably further comprises fixations for retaining pivot pins 18. These fixations can be implemented as openings or borings in the casing's frame 6a, which accommodate the pivot pins 18. The latter are preferably adapted to engage associated receiving openings 19 that are preferably provided in the stepping plate 7b and, more generally, in the step member 7. Consequently, the pivot pins 18 are adapted to define pivot axes for the step member 7.

According to one aspect of the present invention, shim plates 20 are associated with the step member 7. The shim plates 20 are preferably adapted for enabling a horizontal alignment of the step member 7 independent of a respective inclination angle of the casing 6.

It should be noted that modifications to the above described embodiments are within the common knowledge of the person skilled in the art and, thus, also considered as being part of the present invention. It should further be noted that the drawings are only intended for schematically representing embodiments of the present invention and not for showing detailed constructions thereof.

For instance, the step member 7 can be combined with a self-deploying mechanism, such as e.g. a spring. Thus, when opening the maintenance step 4c by pulling the step member 7 out of the casing 6, the stirrup unit 15 is automatically deployed by means of the spring. Furthermore, fixation of the telescopic elements of the stirrup unit 15 can be achieved by various different means, such as e.g. described in U.S. Pat. No. 5,586,628 A, US 2003/0038007 A1, DE 26 43 463 A1, DE 70 06 082 U, U.S. Pat. Nos. 3,612,563 A, 3,892,429 A and DE 10 2012 013 612 A1.

REFERENCE LIST 1 rotary wing aircraft
1a fuselage
1b tail boom
1c tail wing
1d fin
1e drive system accommodating region
1f aircraft outer surface
1g board side wall resp. lateral shell
1h starboard side wall resp. lateral shell
2 aircraft doors and windows
3 maintenance traps
4 board side maintenance steps
4a upper board side maintenance step
4b middle board side maintenance step
4c lower board side maintenance step
5 aircraft emergency exits
6 casing
6a frame-like support structure
6b inner opening
6c overhang
6d receiving opening
6e casing slope
7 step member
7a step member covering plate
7b step member stepping plate
7c fixing elements
7d step member anti-slip means
8 step member locking device
8a lock bar
9 step member hinges
9a upper hinge
9b lower hinge
10a upper hinge clevis
10b lower hinge clevis
11a upper hinge arm
11b lower hinge arm
12 hinge pins
13 attachment point
14 retaining element
15 stirrup unit
15a stirrup upper section
15b stirrup middle section
15c stirrup lower section
15d hinge connecting portions
15e stepping area
15f anti-slip means
16 telescopic element securing pins
17 attachment rope or rod
17a attachment rope or rod fixation element
18 pivot pins
19 pin receiving openings
20 shim plates

What is claimed is:

1. A maintenance step for a helicopter, comprising:
a casing that is adapted for integration into a lateral shell of a fuselage of a helicopter, the casing includes a frame which is closed by a rear wall that is provided for closing up the lateral shell, and
a step member that is pivotally mounted to the casing, wherein
a stirrup unit is pivotally mounted to the step member, the stirrup unit comprising at least a first and a second section, the second section is telescopically mounted to the first section;
wherein the step member is pivotally mounted to the casing around a first axis and the stirrup unit is pivotally mounted to the step member around a second axis, wherein the first axis and the second axis are perpendicular.

2. The maintenance step according to claim 1, wherein the second section of the stirrup unit is at least approximately U-shaped and provides an ascendable stepping area.

3. The maintenance step according to claim 2, wherein the ascendable stepping area is provided with anti-slip means.

4. The maintenance step according to claim 2, wherein the stirrup unit comprises a third section that connects the first section to the second section, the third section is telescopically mounted to the first section and is further telescopically mounted to the second section.

5. The maintenance step according to claim 4, wherein the stirrup unit is provided with securing pins that are adapted for restricting telescopic movement of the first, second and third sections relative to each other.

6. The maintenance step according to claim 1, wherein the step member is provided with anti-slip means.

7. The maintenance step according to claim 1, wherein a locking device is provided for locking the step member in the casing in a closed state of the maintenance step.

8. The maintenance step according to claim 1, wherein the casing is provided with an overhang that is adapted for blocking the step member in an opened state of the maintenance step.

9. The maintenance step according to claim 1, wherein the step member comprises a stepping plate that is provided with a covering plate, the covering plate is implemented as a filling part that is adapted for creating at least approximately a continuous surface with a lateral shell of a fuselage of a helicopter to which the maintenance step is mountable.

10. The maintenance step according to claim 9, wherein the covering plate is attached to the stepping plate by means of associated fixing elements.

11. The maintenance step according to claim 1, wherein an attachment rope or rod is provided, the attachment rope or rod is adapted for securing the step member in an opened state of the maintenance step to a lateral shell of a fuselage of a helicopter to which the maintenance step is mountable.

12. The maintenance step according to claim 1, wherein a retaining element is provided, the retaining element is adapted for releasably retaining the stirrup unit at the step member in a retracted state of the stirrup unit.

13. The maintenance step according to claim 1, wherein shim plates are associated with the step member, the shim plates is adapted for enabling a horizontal alignment of the step member independent of a respective inclination angle of the casing.

14. The maintenance step according to claim 1, wherein the casing is provided with at least one slope that is adapted for preventing water accumulation in the casing.

15. A helicopter with a fuselage that comprises a lateral shell to which a maintenance step according to claim 1 is mounted.

16. A maintenance step for a helicopter, comprising:
   a casing that is adapted for integration into a lateral shell of a fuselage of a helicopter, the casing includes a frame which is closed by a rear wall that is provided for closing the lateral shell, and
   a step member that is pivotally mounted to the casing,
   a stirrup unit is pivotally mounted to the step member, the stirrup unit comprising at least a first and a second section, the second section is telescopically mounted to the first section; and
   wherein the step member is pivotally mounted to the casing around a first axis and the stirrup unit is pivotally mounted to the step member around a second axis, wherein the first axis and the second axis are offset relative to one another in a range between 30° and 60°.

17. The maintenance step according to claim 16, wherein the second section of the stirrup unit is at least approximately U-shaped and provides an ascendable stepping area.

18. The maintenance step according to claim 17, wherein the stirrup unit comprises a third section that connects the first section to the second section, the third section is telescopically mounted to the first section and is further telescopically mounted to the second section.

19. The maintenance step according to claim 16, wherein the step member comprises a stepping plate that is provided with a covering plate, the covering plate is implemented as a filling part that is adapted for creating at least approximately a continuous surface with a lateral shell of a fuselage of a helicopter to which the maintenance step is mountable.

* * * * *